United States Patent
Brezovnik et al.

(10) Patent No.: US 8,210,095 B2
(45) Date of Patent: Jul. 3, 2012

(54) BREW HEAD OF BEVERAGE PREPARATION MACHINE

(75) Inventors: Peter Brezovnik, Mozirje (SI); Henrik Pavlovic, Slowenien (SI); Aleksander Sedovsek, Mozirje (SI); Igor Zibret, Smartno ob Paki (SI)

(73) Assignee: Kraft Foods R & D, Inc., Northfield, IL (US)

( * ) Notice: Subject to any disclaimer, the term of this patent is extended or adjusted under 35 U.S.C. 154(b) by 940 days.

(21) Appl. No.: 12/244,844

(22) Filed: Oct. 3, 2008

(65) Prior Publication Data

US 2010/0083842 A1   Apr. 8, 2010

(51) Int. Cl.
*A47J 31/06*     (2006.01)

(52) U.S. Cl. ............. 99/295; 99/279; 99/281; 99/289 T; 99/289 R

(58) Field of Classification Search ............ 99/295, 99/279, 281, 289 T, 289 R
See application file for complete search history.

(56) References Cited

U.S. PATENT DOCUMENTS

2008/0000357 A1*  1/2008  Yang et al. ................ 99/279

* cited by examiner

*Primary Examiner* — Shawntina Fuqua
(74) *Attorney, Agent, or Firm* — Fitch, Even, Tabin & Flannery, LLP

(57) ABSTRACT

A brew head for a beverage brewer includes a lid, a handle rotatably mounted to the lid and including a cam surface, and a spring mounted to the lid with a follower that engages the cam surface such that movement of the handle from an open position to a closed position relative to the lid, or vice-versa, by a user causes the user to experience a clicking feeling.

17 Claims, 8 Drawing Sheets

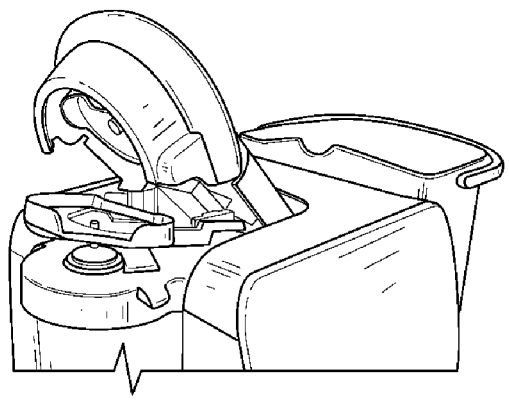 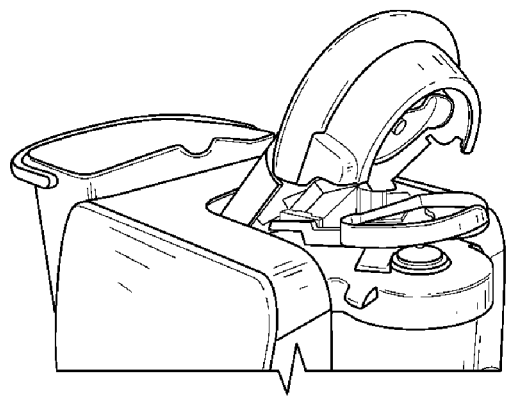
FIG. 5  FIG. 6
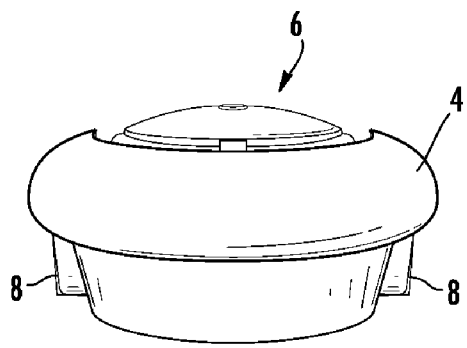 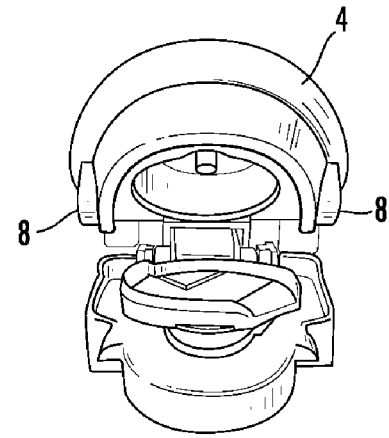
FIG. 7  FIG. 8
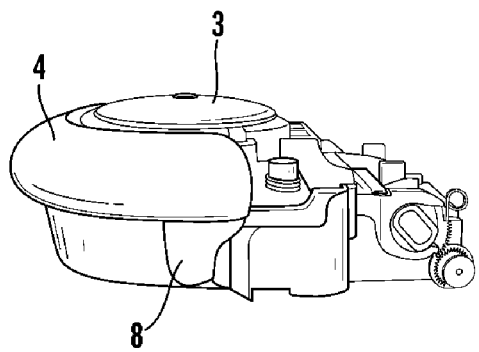 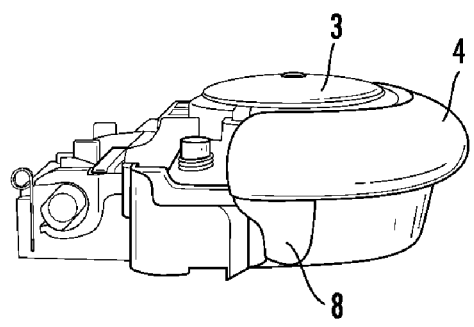
FIG. 9  FIG. 10

BREW HEAD OF BEVERAGE PREPARATION MACHINE

BACKGROUND OF THE INVENTION

1. Field of the Invention

The present invention is related to the field of beverage preparation machines. In particular, the present invention is directed to a brew head of a beverage preparation machine.

2. Related Art

Conventional beverage preparation machines include brew heads which have been difficult to close. These brew heads are lacking in compactness, do not have clear defined initial and end points, and are not self arrestive.

SUMMARY OF THE INVENTION

A brew head in accordance with an exemplary embodiment of the present invention solves the problems of the related art. The present invention provides an easy-to-close and compact brew head.

An exemplary embodiment solves these problems by providing a handle pivotally mounted on a lid with a spring/cam/follower mechanism. In this manner, the brew head provides an easy-to-close and compact brew head.

An exemplary embodiment of the present invention provides a brew head for a beverage brewer that includes a lid, a handle rotatably mounted to the lid and including a cam surface, and a spring mounted to the lid with a follower that engages the cam surface such that movement of the handle from an open position to a closed position relative to the lid, or vice-versa, by a user causes the user to experience a clicking feeling.

BRIEF DESCRIPTION OF THE DRAWINGS

An exemplary embodiment of the present invention is described below with reference to the accompanying drawings, in which:

FIG. 5 is a further partial cut-away perspective view of the beverage preparation machine 1 of FIG. 1;

FIG. 6 is yet another partial cut-away perspective view of the beverage preparation machine 1 of FIG. 1;

FIG. 7 is a front perspective view of the brew head 6 from FIG. 1 in a closed position;

FIG. 8 is a front perspective view of the brew head 6 from FIG. 1 in an open position;

FIG. 9 is a left side view of the brew head 6 from FIG. 7;

FIG. 10 is a right side view of the brew head 6 from FIG. 7;

DETAILED DESCRIPTION OF AN EXEMPLARY EMBODIMENT

Figure 1:
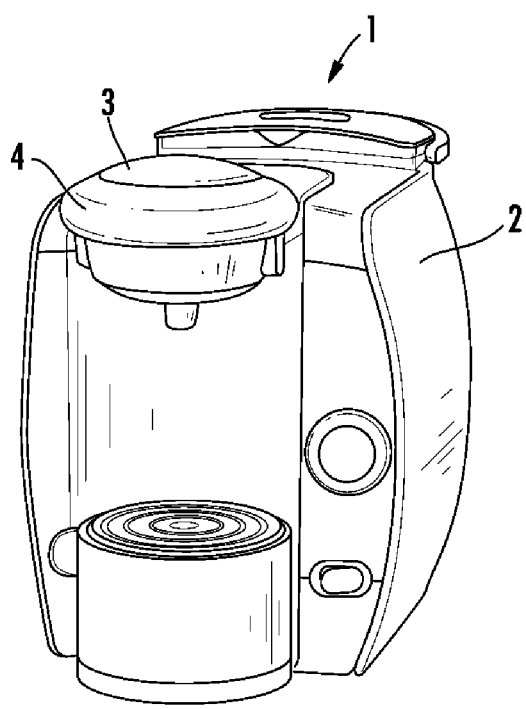
FIG. 1 is a perspective view of an exemplary embodiment of a beverage preparation machine 1 incorporating a brew head 6 in accordance with the present invention.
Figure 2:
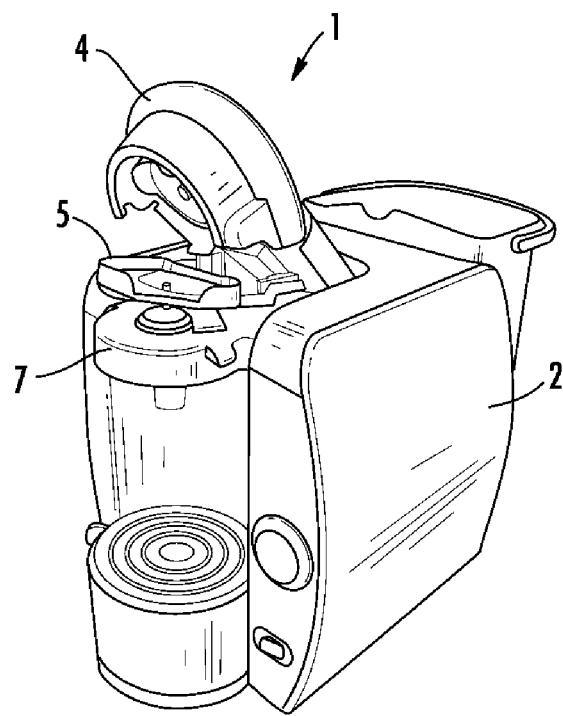
FIG. 2 is another perspective view of the beverage preparation machine 1 of FIG. 1.
Figure 3:
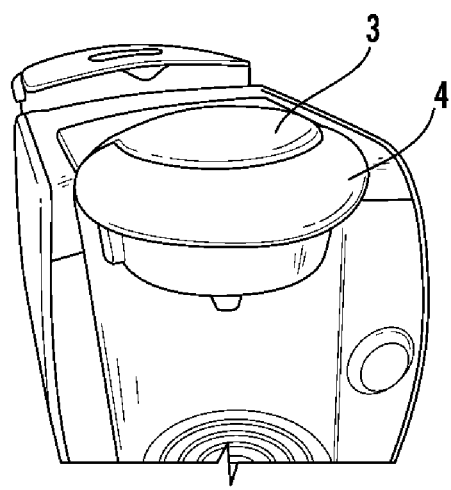
FIG. 3 is a partial cut-away perspective view of the beverage preparation machine 1 of FIG. 1.
Figure 4:
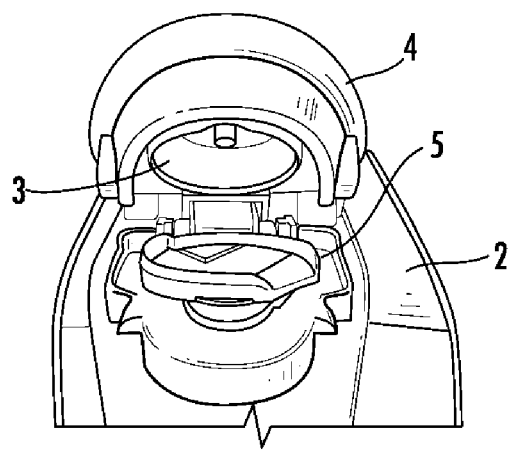
FIG. 4 is another partial cut-away perspective view of the beverage preparation machine 1 of FIG. 1.
Figure 11:
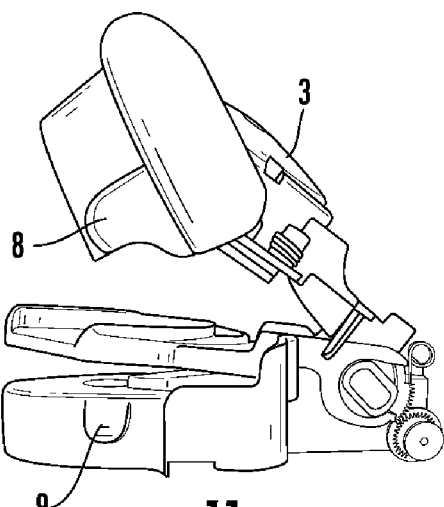
FIG. 11 is a left side view of the brew head 6 from FIG. 7 with the lid 3 and handle 4 in open positions.
Figure 12:
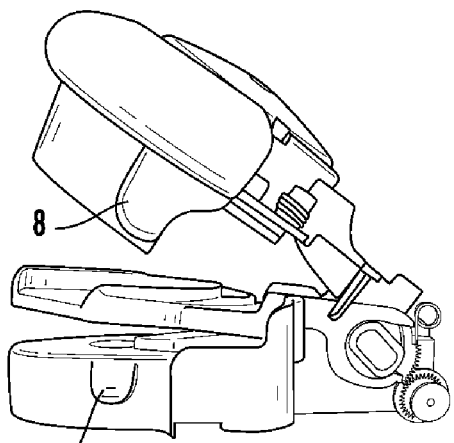
FIG. 12 is a left side view of the brew head 6 from FIG. 7 with the lid 3 in an open position and the handle 4 in a closed position.
Figure 13:
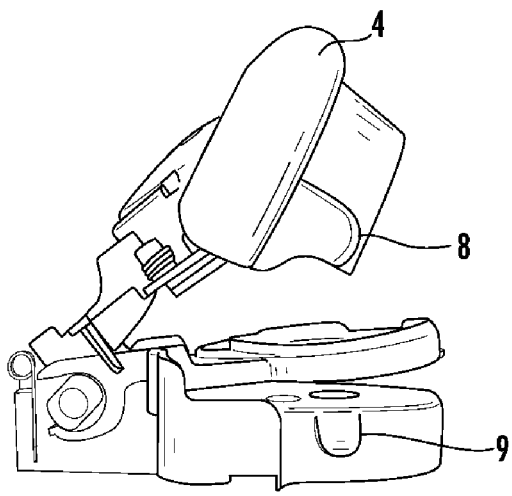
FIG. 13 is a right side view of the brew head 6 from FIG. 7 with the lid 3 and the handle 4 in open positions.
Figure 14:
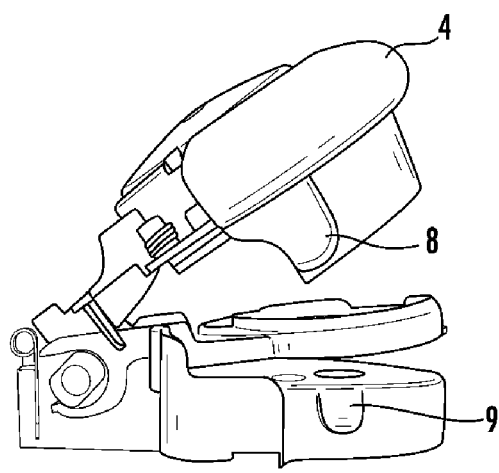
FIG. 14 is a right side view of the brew head 6 from FIG. 7 with the lid 3 in an open position and the handle 4 in a closed position.
Figure 15:
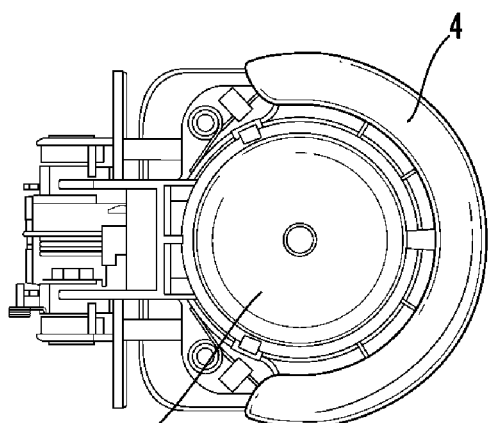
FIG. 15 is a plan view of the brew head 6 from FIG. 7 in a closed position.
Figure 16:
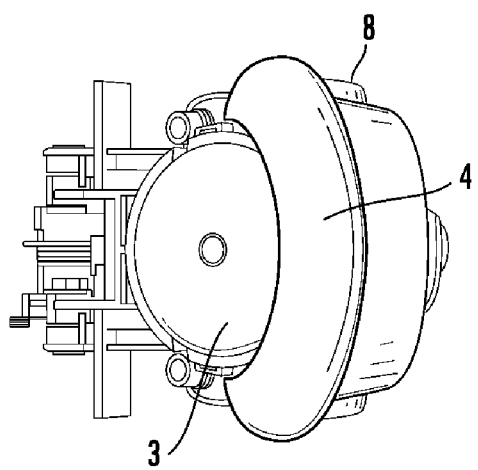
FIG. 16 is a plan view of the brew head 6 from FIG. 7 with the lid 3 and handle 4 in open positions.
Figure 17:
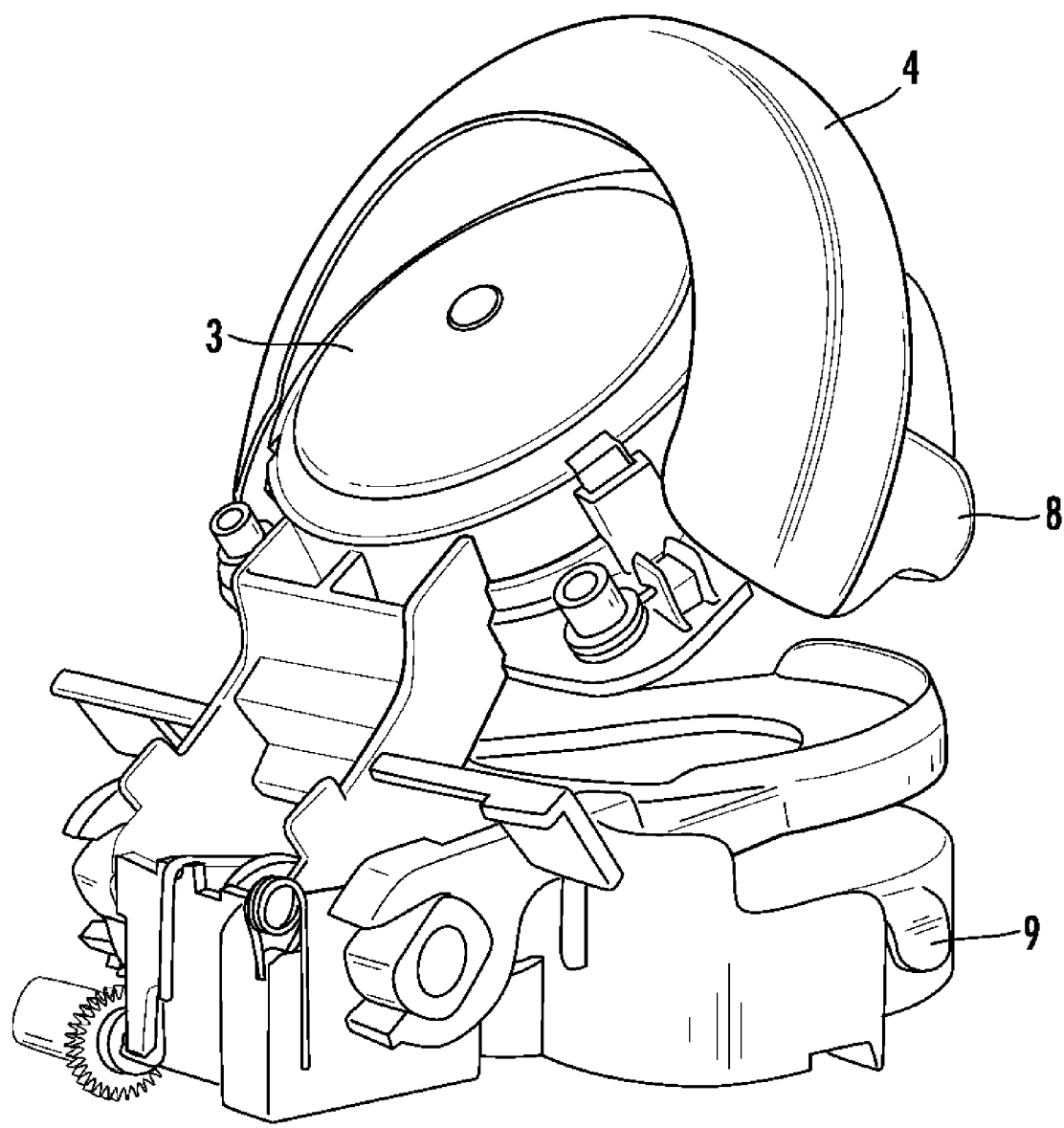
FIG. 17 is a perspective view of the brew head 6 from FIG. 7 with the lid 3 and handle 4 in open positions.

FIGS. 1-6 illustrate an exemplary beverage preparation machine 1 in accordance with the present invention. The beverage preparation machine 1 includes a housing 2, a lid 3, a handle 4, a base 7, and a receptacle 5 for receiving a beverage cartridge (not shown). The lid 3 rotates about an axis between a closed position (FIGS. 1 and 3) and an open position (FIGS. 2 and 4-6). When moving the lid 3 from the open position to the closed position, the lid 3 rotates toward the base 7. In the open position, the lid 3 is inclined with respect to the base 7.

The receptacle 5 similarly rotates about the same axis as the lid 3. The receptacle 5 rotates between a closed position and an open position. When moving the receptacle 5 from the open position to the closed position, the receptacle 5 similarly rotates about the same axis towards the base 7. In the closed position, the receptacle 5 is parallel to the base 7. In the open position, the receptacle 5 is inclined with respect to the base 7.

Penetrating pins are disposed on the base 7 of the brewer. In operation, a cartridge (not shown) is inserted into the receptacle 5 and the receptacle 5 and lid 3 are rotated to the closed position. The rotation of the receptacle 5 and lid 3 to the closed position causes the cartridge to engage the penetrating pins, which penetrate the surface of the cartridge for applying a liquid to the cartridge and retrieving a brewed beverage from the cartridge. When the receptacle 5 of the brewer is moved to an inclined position, or open position, the receptacle 5 lifts the cartridge off of the penetrating pins to facilitate removal of the cartridge from the brewer.

When rotating from the open position to the closed position, the lid 3 and the receptacle 5 rotate about the same axis and in the same direction towards the base 7. In the closed position, the lid 3 and the receptacle 5 are parallel to the base 7.

When rotating from the closed position to the open position, the lid 3 and the receptacle 5 rotate about the same axis and in the same direction away from the base 7. In the open position, the lid 3 and the receptacle 5 are inclined with respect to the base 7. In the open position, the receptacle 5 faces the inside surface of the lid 3.

As clearly illustrated by FIGS. 5-17, the handle 4 includes locking latches 8 that engage locking pins 9 of the base 7 when the lid 3 and the handle 4 are in closed positions. The handle 4 pivots with respect to the lid 3 to rotate the locking latches 8 over the locking pins 9 of the base 7 after the lid 3 has been rotated into a closed position. The locking latches 8 and pins 9 hold the lid 3 and the handle 4 in closed positions in opposition to the force of a lid spring 10.

The handle 4 is free to rotate between open and closed positions without causing any rotation of the receptacle 5. Moreover, the handle 4 is free to rotate between open and closed positions without causing any rotation of the lid 3.

The lid 3 is also rotatable between the open position and the closed position without rotating the handle 4 from the open position to the closed position. That is, by exerting force directly on top of the lid 3, the lid 3 is rotated from the open position to the closed position while the position of the handle 4 remains entirely unchanged.

When the lid 3 is rotated from the open position to the closed position, the inside surface of the lid 3 contacts an upper surface of the receptacle 5 and overcomes a biasing force of a receptacle spring (not shown) which biases the receptacle 5 toward an inclined position away from a horizontal position. Thus, contact between the lid 3 and the receptacle 5 causes the rotation of the receptacle, not the rotation of the handle 4. The rotation of the handle 4 is independent of the rotation of the receptacle 5.

Further, the receptacle 5 is also free to rotate between a horizontal position and an inclined position without any rotation of the handle 4 or the lid 3. The receptacle 5 is biased toward the inclined position by a dedicated receptacle spring (not shown). When force is applied to the receptacle 5 the receptacle 5 rotates from the horizontal position to the inclined position without any rotation from the handle 4 or the lid 3.

Figure 18:
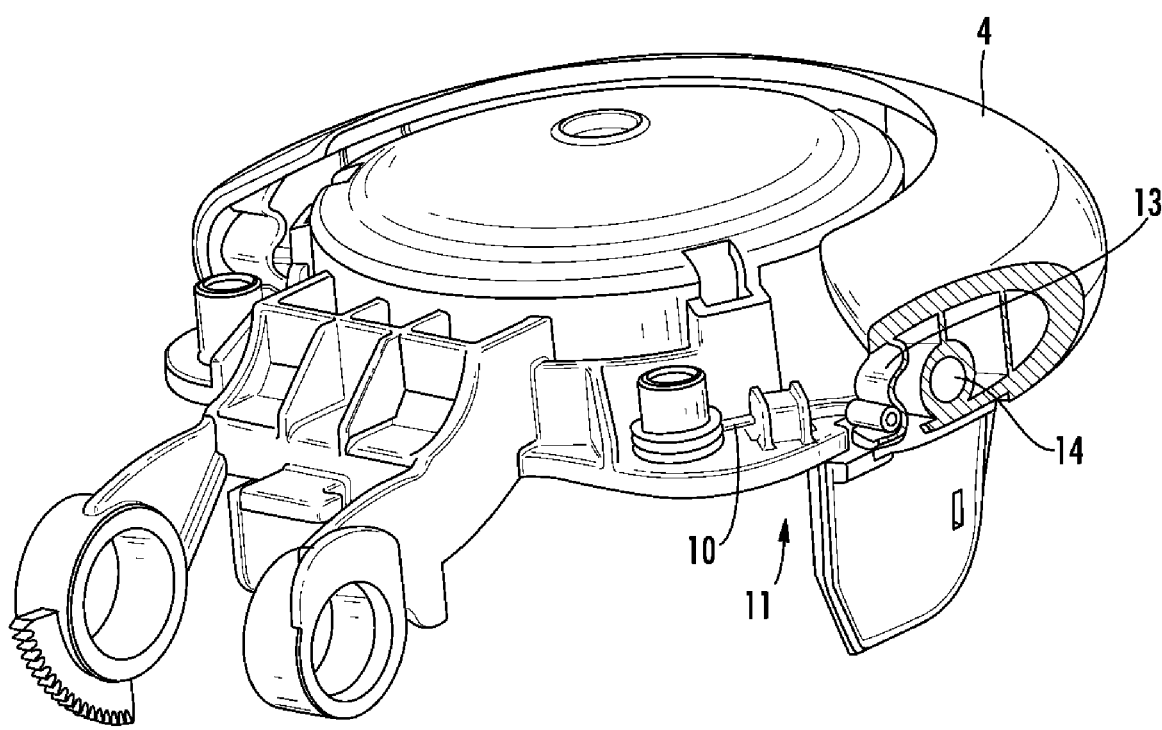
FIG. 18 is a partial cut-away perspective view of the brew head 6 with the base 7 and receptacle 5 removed with the handle 4 in a closed position.
Figure 19:
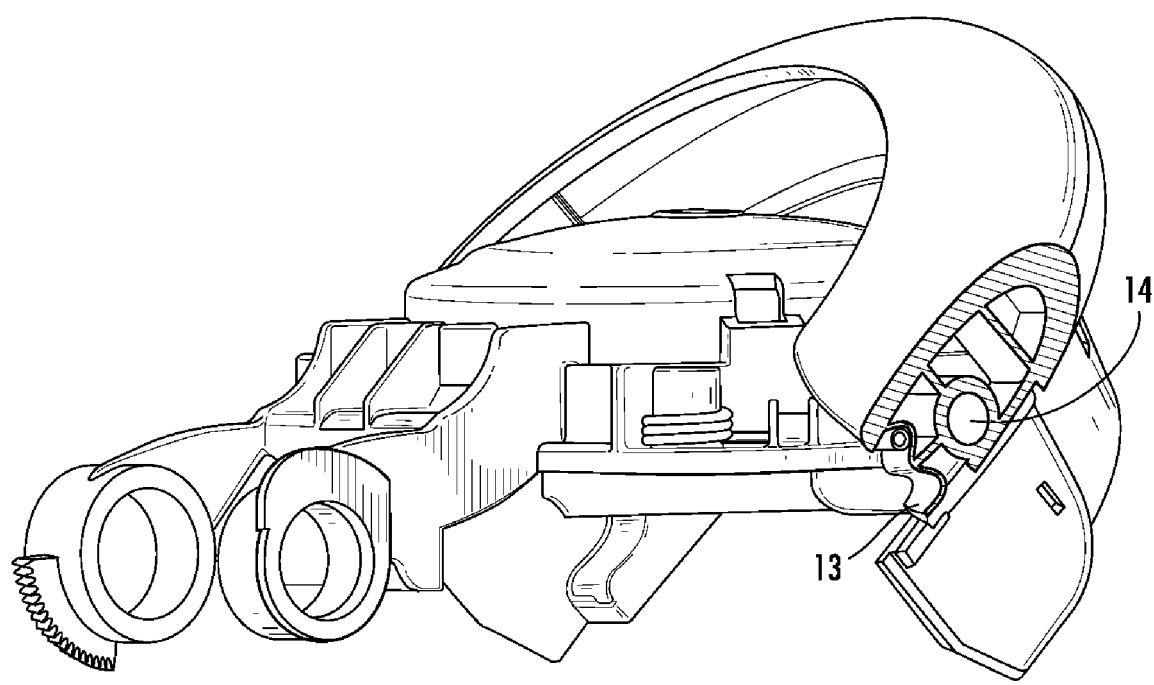
FIG. 19 is a partial cut-away perspective view of the brew head 6 of FIG. 18 with the handle 4 in an open position
Figure 20:
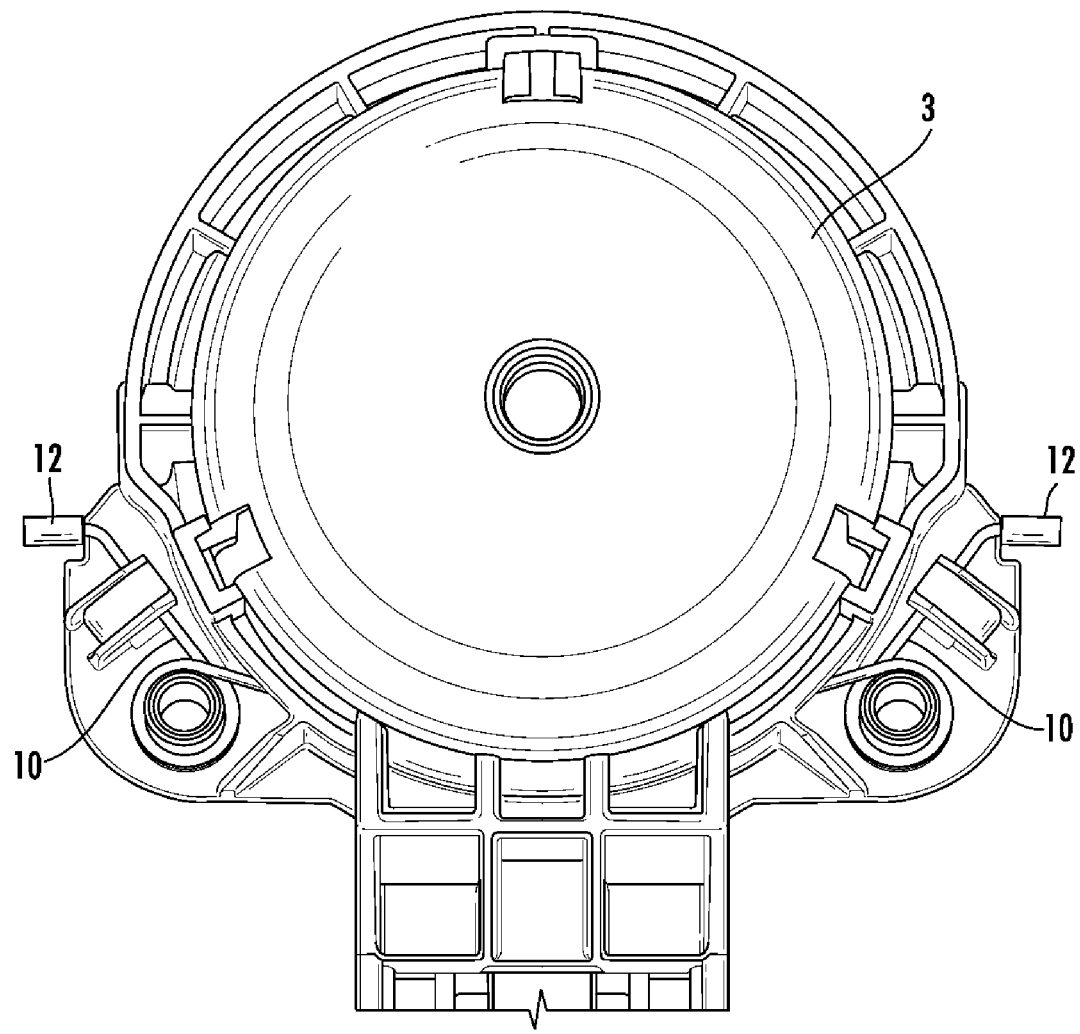
FIG. 20 is a plan view of the brew head 6 of FIG. 18 with the handle 4 removed.
Figure 21:
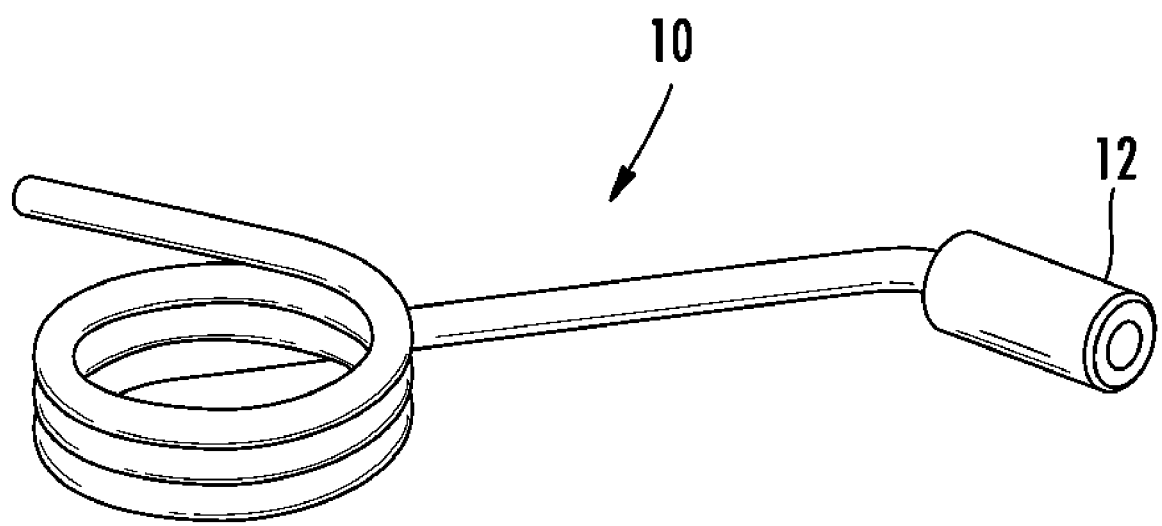
FIG. 21 illustrates a lid spring 10 of the brew head 6 of FIG. 18.

As is clearly illustrated by FIGS. 18-19, the handle 4 is rotatably connected to opposing sides of the lid 3. The handle 4 includes a spring/cam/follower mechanism 11 on each side of the lid 3 adjacent to the locations where the handle 4 is rotatably connected to the lid 3 at pivot 14. The spring/cam/follower mechanism 11 provides a "clicking" feature when the handle 4 rotates from the open position to the closed position. Particularly, each spring/cam/follower mechanism 11 of the lid 3 includes a lid spring 10 (more clearly shown in FIGS. 20 and 21) having a rotatable follower 12 disposed on an end of the spring 10. The adjacent surface of the handle 4 includes a curved or sinusoidal cam surface 13. In operation, the follower 12 starts in a first, original position when the handle 4 is in the open position (FIG. 19). The follower 12 is deflected to a second position by the sinusoidal cam surface 13 of the handle 4 when the handle 4 is in motion from the open position to the closed position, and vice-versa. The follower 12 returns to the first, original position when the handle 4 is in the closed position (FIG. 18). Thus, the user experiences a "clicking" feeling and sound as the handle 4 is moved from the open position to the closed position, and vice versa.

The deflection of the follower 12, which results from the movement of the cam surface 13 of the handle 4, is illustrated by FIGS. 18 and 19. When the handle 4 is in the process of rotating from the open position (FIG. 19) to the closed position (FIG. 18), the rotation of the cam surface 13 causes the follower 12 to deflect from a first amount of deflection to a second, higher amount of deflection as the follower 12 crosses the "hump" of the cam surface 13. The follower 12 then returns to its first, original amount of deflection when the handle 4 is in the fully closed position (FIG. 18).

The follower 12 of the brewer starts in a first, original amount of deflection (FIG. 19). When the handle 4 is in the process of rotating from the open position (FIG. 19) to the closed position (FIG. 18), the rotation of the cam surface 13 about the pivot 14 causes the follower 12 to deflect from its first, original amount of deflection. The follower 12 then returns to its original, first amount of deflection when the handle 4 rotates into the closed position (FIG. 18). None of the deflection of the follower 12 from the original amount of deflection, which results from the rotation of the handle 4 from the open position to the closed position, remains when the follower 12 is in the closed position, then the follower 12 returns to the original, first amount of deflection.

As explained above, the lid 3 is rotatable about an axis with respect to the housing 2. The lid 3 includes a lid spring (not shown) that biases the lid 3 in a direction of rotation toward the open position. The lid spring does not hold the handle 4 in the closed position. The handle 4 can be either in the open or closed position irrespective of the state of the lid spring (deflected or not). Furthermore, the lid spring applies a force to the lid 3 and the handle 4 (as a result of the handle 4 being attached to the lid) toward a lid open position.

The receptacle 5 has a dedicated spring mechanism (not shown) for biasing the receptacle 5 toward an inclined position. The handle 4 is free to rotate between an open position and a closed position with respect to the lid, without causing any rotation of the receptacle 5. The rotation of the handle 4 is independent of the movement of the receptacle 5.

Further, the receptacle 5 is free to rotate between the horizontal position and the inclined position without any rotation of the handle 4. The receptacle 5 is biased toward the inclined position by the dedicated receptacle spring. When force is applied to the receptacle 5, the receptacle 5 rotates from the inclined position to the horizontal position without any rotation from the handle 4 or lid 3.

The receptacle spring does not hold the handle 4 in the closed position. The handle 4 can be either in the open position or the closed position irrespective of the state of the receptacle spring (deflected or not). Further, the receptacle spring biases the receptacle 5 toward the lid 3, and thus, toward the handle 4.

The lid 3 rotates about an axis between a closed position and an open position. When moving the lid 3 from the open position to the closed position, the lid 3 rotates toward the base 7. In the closed position, the lid 3 is parallel to the base 7. In the open position, the lid 3 is inclined with respect to the base 7.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. Further, although elements of the invention may be described or claimed in the singular, the plural is contemplated unless limitation to the singular is explicitly stated.

The invention claimed is:

1. A brew head for a beverage brewer, comprising:
   a lid;
   a handle rotatably mounted to the lid and including a cam surface; and
   a spring mounted to the lid with a follower that engages the cam surface such that movement of the handle from an open position to a closed position relative to the lid, or vice-versa, by a user causes the user to experience a clicking feeling.

2. The brew head of claim 1, wherein the handle is free to rotate between open and closed positions without any movement of the lid and vice-versa.

3. The brew head of claim 1, wherein the cam surface is sinusoidal.

4. The brew head of claim 1, further comprising a base, wherein the lid is pivotally mounted to the base.

5. The brew head of claim 4, wherein the base includes locking pins.

6. The brew head of claim 5, wherein the handle includes locking latches.

7. The brew head of claim 6, wherein the locking latches engage the locking pins when the lid is in a closed position and the handle is in the closed position such that the lid and the handle are maintained in a closed position.

8. The brew head of claim 6, wherein the locking latches engage the locking pins when the handle rotates from an open position to a closed position while the lid is maintained in a closed position.

9. The brew head of claim 4, further comprising a beverage cartridge receptacle that is pivotally mounted to the base.

10. The brew head of claim 9, wherein the handle is free to move between the open position and the closed position without any movement of the beverage cartridge receptacle and vice-versa.

11. The brew head of claim 4, wherein the base includes penetrating pins for penetrating the beverage cartridge positioned within a beverage cartridge receptacle and for applying a liquid to the beverage cartridge and retrieving a brewed beverage from the beverage cartridge.

12. The brew head of claim 11, wherein the receptacle is rotatable between an inclined position at which the receptacle holds a beverage cartridge away from the penetrating pins and a horizontal position at which the receptacle positions the beverage cartridge such that the penetrating pins penetrate the beverage cartridge.

13. The brew head of claim 12, further comprising a beverage receptacle spring that biases the beverage receptacle toward the inclined position.

14. The brew head of claim 9, wherein the lid and the receptacle rotate about the same axis and in the same direction away from a base of the brew head when moving from an open configuration to a closed configuration and vice-versa.

15. The brew head of claim 1, wherein the follower starts in a first position along the cam surface at the open position of the handle where the spring is deflected by a first amount of deflection, travels along the cam surface to increase the deflection of the spring from the first amount of deflection, and ends at a second position along the cam surface at the closed position of the handle where the spring is deflected by the same amount as the first amount of deflection.

16. The brew head of claim 1, further comprising a lid spring that biases the lid toward an open position away from a closed position.

17. The brew head of claim 1, wherein the follower is rotatable and is located at an end of the spring that is adjacent the cam surface.

* * * * *